(No Model.)
J. T. FLYNN.
BOOT TREE.
No. 340,566. Patented Apr. 27, 1886.
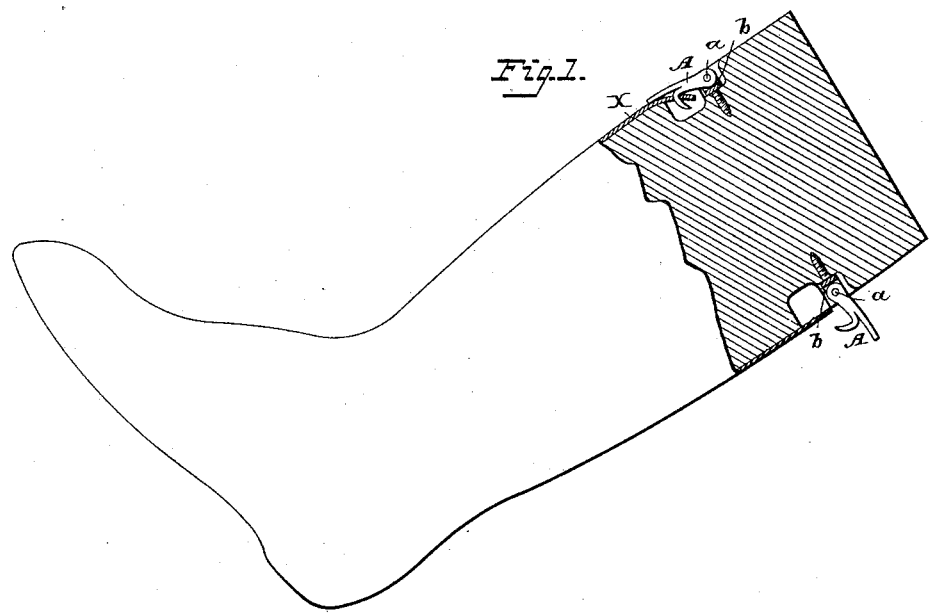
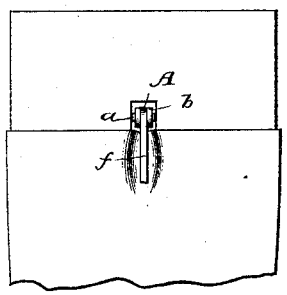
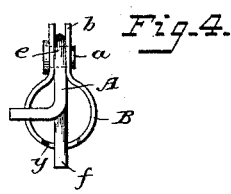
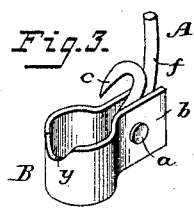
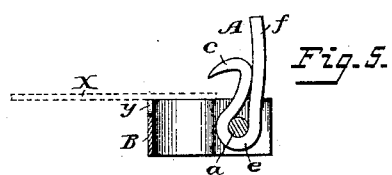
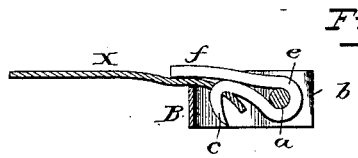
Attest:
Cout. A. Cooper,
J. Campbell.
John T. Flynn
Inventor:
by Foster & Freeman
Attys

UNITED STATES PATENT OFFICE.

JOHN T. FLYNN, OF MILLVILLE, MASSACHUSETTS.

BOOT-TREE.

SPECIFICATION forming part of Letters Patent No. 340,566, dated April 27, 1886.

Application filed December 16, 1885. Serial No. 185,856. (No model.)

*To all whom it may concern:*

Be it known that I, JOHN T. FLYNN, a citizen of the United States, and a resident of Millville, in the county of Worcester and State of Massachusetts, have invented certain new and useful Improvements in Boot-Trees, of which the following is a specification.

My invention consists of a device, described hereinafter, adapted to be combined with the leg of a boot-tree to readily secure thereto and permit the detachment of the piece of leather or other fabric stretched upon the tree.

In the drawings, Figure 1 is a side view of a boot-tree in part section, showing my improvement. Fig. 2 is a plan view of the portion of the tree adjacent to the attaching device, showing the latter in position holding the fabric in place. Fig. 3 is a perspective view of the attachment. Fig. 4 is a plan view showing a modification. Fig. 5 is a longitudinal section showing the hook up; Fig. 6, the same showing the hook down.

The device consists of a hook constructed for ready attachment to the leg portion of the tree and capable of being turned down into a recess thereof, so as to seize and hold securely the material upon the tree, and adapted to be readily withdrawn from the material to release the same.

The hook may be pivoted to a slit within the tree and turned down into a notch or recess opposite the said slit. I prefer, however, to pivot the hook A to a pivot, $a$, extending through lips or arms $b$, projecting from a split ring or yoke, B, formed by bending a strip of metal to the shape shown in Fig. 3, and inserting the device in a recess cut for its reception in the leg of the tree.

The hook may be stamped out of metal or formed in any suitable manner. I prefer, however, to make it by bending a piece of wire, sharpened at one end, so as to form the hook $c$, the loop $e$, for the passage of the pivot $a$, and a stem, $f$, which projects beyond the hook, and serves as a means of readily lifting the latter.

When the device is inserted in the leg of the tree, it is used as follows: The sheet or strip of leather or other fabric, X, is applied to the tree, as usual, and the hook A is turned to the position shown in Figs. 3 and 5, and the edge of the strip is brought beneath the hook, as shown in dotted lines, Fig. 5, after which the hook is turned down to the position shown in Fig. 6, when the pointed hook portion $c$ will penetrate the fabric and will securely hold the same in the position to which it is adjusted.

It will be noticed that owing to the shape of the hook $c$, which is curved to correspond as nearly as may be to a circle having the pivot $a$ as a center, the fabric is seized without drawing upon it, and is also held so that it will not become loose as the hook reaches the position shown in Fig. 6.

The arm $f$ serves as a ready means of withdrawing the hook, and the yoke B is provided with a notch, $y$, to receive the said arm, so that when the hook is turned down to the position shown in Fig. 6 no portion of the device projects to any material extent beyond the surface of the tree, and danger of injury and displacement is thus prevented.

The arm $f$ may be bent to one side, as shown in Fig. 4 in full lines, or to both sides, as shown by full and dotted lines, or it may be of any other suitable shape so as to be readily caught between the fingers and lie flat when depressed.

Without limiting myself to the precise construction and arrangement of parts shown, I claim—

1. The combination, with a boot-tree having a recess in the leg, of a hook pivoted adjacent to said recess, and consisting of a strip of wire sharpened and bent into a hook at one end, having a loop, $e$, for the passage of the pivot, and prolonged to form an arm, $f$, substantially as set forth.

2. The combination, with a boot-tree, of the loop terminating in ears $b$, and a hook consisting of a strip of wire bent to form a hook, $c$, loop $e$, and arm $f$, substantially as set forth.

3. The combination, in a boot-tree, of a yoke, B, having a notch, $y$, and ears $b$, in combination with a hook pivoted between said ears, and provided with a stem, $f$, substantially as set forth.

In testimony whereof I have signed my name to this specification in the presence of two subscribing witnesses.

JOHN T. FLYNN.

Witnesses:
GEORGE ROSS,
LYMAN LEGG.